US012597679B2

(12) United States Patent
Pekala et al.

(10) Patent No.: US 12,597,679 B2
(45) Date of Patent: Apr. 7, 2026

(54) FRICTION ENHANCING CORE SURFACE OF BATTERY SEPARATOR ROLL AND RELATED METHODS

(71) Applicant: Amtek Research International LLC, Lebanon, OR (US)

(72) Inventors: Richard W. Pekala, Corvallis, OR (US); Jennifer Stock, Lebanon, OR (US)

(73) Assignee: Amtek Research International LLC, Lebanon, OR (US)

( * ) Notice: Subject to any disclaimer, the term of this patent is extended or adjusted under 35 U.S.C. 154(b) by 0 days.

(21) Appl. No.: 17/428,950

(22) PCT Filed: Feb. 6, 2020

(86) PCT No.: PCT/US2020/017089
§ 371 (c)(1),
(2) Date: Aug. 5, 2021

(87) PCT Pub. No.: WO2020/163649
PCT Pub. Date: Aug. 13, 2020

(65) Prior Publication Data
US 2022/0140443 A1      May 5, 2022

Related U.S. Application Data

(60) Provisional application No. 62/802,147, filed on Feb. 6, 2019.

(51) Int. Cl.
*H01M 50/463*      (2021.01)
*H01M 10/12*      (2006.01)
(Continued)

(52) U.S. Cl.
CPC ......... *H01M 50/463* (2021.01); *H01M 10/12* (2013.01); *H01M 50/409* (2021.01); *H01M 50/446* (2021.01); *H01M 50/449* (2021.01)

(58) Field of Classification Search
CPC ................................................. H01M 50/463
See application file for complete search history.

(56) References Cited

U.S. PATENT DOCUMENTS 8,703,313 B2 * 4/2014 Sohn ................... H01M 50/469
429/61
2005/0123828 A1 * 6/2005 Oogami ............. H01M 50/503
(Continued)

FOREIGN PATENT DOCUMENTS

CN          106006134 A      10/2016
JP          S58100142 U      6/1983
(Continued)

OTHER PUBLICATIONS

Powers, Robert A., Batteries for Low Power Electronics, 83 (4) Proceedings of the IEEE, pp. 687-693, Apr. 1995. (Year: 1995).*
(Continued)

*Primary Examiner* — Nicole M. Buie-Hatcher
*Assistant Examiner* — Krishna R Hammond
(74) *Attorney, Agent, or Firm* — Dorsey & Whitney LLP

(57) ABSTRACT

Rolls of battery separator material and related methods are disclosed. A roll of battery separator material includes a core including an outside surface, a separator material rolled around the core, and a friction enhancing surface on at least a portion of the outside surface of the core to prevent the separator material from lateral migration relative to the outside surface of the core.

20 Claims, 6 Drawing Sheets

(51) Int. Cl.
  *H01M 50/409*    (2021.01)
  *H01M 50/446*    (2021.01)
  *H01M 50/449*    (2021.01)

(56)                References Cited

U.S. PATENT DOCUMENTS

| | | | |
|---|---|---|---|
| 2012/0164538 | A1 | 6/2012 | Inagaki et al. |
| 2014/0322585 | A1 | 10/2014 | Izuka et al. |
| 2016/0280505 | A1 | 9/2016 | Stinson |
| 2017/0033347 | A1 | 2/2017 | Murakami et al. |
| 2017/0244083 | A1* | 8/2017 | Yashiki |
| 2017/0317331 | A1* | 11/2017 | Vedoy |
| 2018/0062144 | A1 | 3/2018 | Hashiwaki |
| 2018/0083247 | A1* | 3/2018 | Seo |

FOREIGN PATENT DOCUMENTS

| | | | | |
|---|---|---|---|---|
| JP | S63175130 | | 7/1988 | |
| JP | 2010159810 | A | 7/2010 | |
| JP | 2017152214 | A | 8/2017 | |
| KR | 20080027502 | A * | 3/2008 | |
| WO | WO-2019028251 | A1 * | 2/2019 | ............ H01M 10/54 |

OTHER PUBLICATIONS

International Search Report and Written Opinion for International Application No. PCT/US2020/017089, mailed Jun. 23, 2020, 11 pages.

* cited by examiner

FRICTION ENHANCING CORE SURFACE OF BATTERY SEPARATOR ROLL AND RELATED METHODS

CROSS-REFERENCE TO RELATED APPLICATIONS

This patent application is the U.S. National Stage filing under 35 U.S.C. 371 of International Patent Application No. PCT/US2020/017089 entitled FRICTION ENHANCING CORE SURFACE OF BATTERY SEPARATOR ROLL AND RELATED METHODS, filed on Feb. 6, 2020, which claims priority to U.S. Provisional Patent Application No. 62/802,147 entitled ABRASIVE CORE SURFACE OF BATTERY SEPARATOR ROLL AND RELATED METHODS, filed on Feb. 6, 2019, each of which is incorporated herein by reference in its entirety.

COPYRIGHT NOTICE

TECHNICAL FIELD

This invention relates to a battery separator for use in a lead-acid battery and, in particular, to a separator roll core with a friction enhancing surface on the core that limits slippage of the separator roll on the core and releases cleanly when fully unwound.

BACKGROUND INFORMATION

The valve regulated lead acid (VRLA) and the flooded lead-acid are two different types of commercially available lead-acid battery designs. Both types include adjacent positive and negative electrodes that are separated from each other by a porous battery separator. The porous separator prevents electrical shorts between adjacent electrodes and provides space for an electrolyte to reside. Such separators are formed of materials that are sufficiently porous to permit the electrolyte to reside in the pores of the separator material, thereby permitting ionic current flow between adjacent positive and negative plates.

The first type of lead-acid battery, VRLA, typically includes an absorptive glass mat (AGM) separator composed of microglass fibers. While AGM separators provide high porosity (>90%), low ionic resistance, and uniform electrolyte distribution, they are relatively expensive. Furthermore, AGM separators exhibit low puncture resistance that is problematic for two reasons: (1) the incidence of short circuits increases and (2) manufacturing costs are increased because of the fragility of the AGM sheets. In some cases, battery manufacturers select thicker, more expensive, separators to improve the puncture resistance, while recognizing that the ionic resistance increases with thickness.

The second type of lead-acid battery, the flooded battery, is characterized by absorption of only a small portion of the electrolyte into the separator. Flooded cell battery separators typically include porous derivatives of cellulose, polyvinyl chloride, organic rubber, and polyolefins. More specifically, microporous polyethylene separators are commonly used because of their ultrafine pore size, which inhibits dendritic growth while providing low ionic resistance, high puncture strength, good oxidation resistance, and excellent flexibility. These properties facilitate sealing of the battery separator into a pocket or envelope configuration in which a positive or negative electrode can be inserted.

More recently, enhanced flooded batteries (EFB) have been developed to meet the high cycling requirements in "start-stop" or "micro-hybrid" vehicle applications. In such applications, the engine is shut off while the car is stopped (e.g., at a traffic light) and then re-started afterwards. The advantage of a "start-stop" vehicle design is that it results in reduced $CO_2$ emissions and better overall fuel efficiency. A major challenge in "start-stop" vehicles is that the battery must continue to supply all electrical functions during the stopped phase while being able to supply sufficient electric current to re-start the engine at the required moment. In such cases, the battery must exhibit higher performance with respect to cycling and recharge capability, as compared to that of a traditional flooded lead-acid battery design.

Most flooded lead-acid batteries include polyethylene separators. The term "polyethylene separator" is something of a misnomer because these microporous separators require large amounts of precipitated silica to be sufficiently acid wettable. The volume fraction of precipitated silica and its distribution in the separator generally control its electrical properties, while the volume fraction and orientation of polyethylene in the separator generally control its mechanical properties. The porosity range for commercial polyethylene separators is generally 50% to 65%.

The primary purposes of the polyolefin contained in the separator are to (1) provide mechanical integrity to the polymer matrix so that the separator can be enveloped at high speeds and (2) to prevent grid wire puncture during battery assembly or operation. Thus, the hydrophobic polyolefin preferably has a molecular weight that provides sufficient molecular chain entanglement to form a microporous web with high puncture resistance. The primary purpose of the hydrophilic silica is to increase the acid wettability of the separator web, thereby lowering the electrical resistivity of the separator. In the absence of silica, the sulfuric acid would not wet the hydrophobic web and ion transport would not occur, resulting in an inoperative battery.

During the manufacture of polyethylene separators, precipitated silica is typically combined with a polyolefin, a process oil, and various minor ingredients to form a separator mixture that is extruded at elevated temperature through a sheet die to form an oil-filled sheet. The oil-filled sheet is calendered to its desired thickness and profile, and the majority of the process oil is extracted. The sheet is dried to form a microporous polyolefin separator and is slit into an appropriate width for a specific battery design. The separator may be wound onto a core and into a roll for transportation and for convenient use during battery manufacturing.

As batteries are manufactured (e.g., lead-acid batteries), enveloping equipment unwinds separator material from a roll of battery separator material, cuts the separator material, forms the separator material into an "envelope", inserts a battery electrode into the envelope, and seals the edges to form an electrode package. The electrode packages are stacked such that the separator acts as a physical spacer and an electronic insulator between positive and negative electrodes. An electrolyte is then introduced into the assembled battery to facilitate ionic conduction within the battery.

Proper assembly of a battery often involves careful control of the orientation and rate at which the separator material is fed into the enveloping equipment, so as to avoid equipment malfunction due to misfeed of the separator material. This involves mounting the roll so as to allow the separator material to unwind from the roll freely and feed into the enveloping equipment. Forming a roll to achieve this objective entails use of a sheet of battery separator material wound on a roll around the outside surface of a cardboard core. The side margins of the wound roll of separator material are aligned to form substantially level side surfaces that are centered between the outer edges of the core.

Winding the sheet of separator material to form level side surfaces confined between the outer edges of the core and maintaining that level side surface is a challenge for at least two reasons. The first reason is that the separator material tends to slip in the direction of the axis of the core as the roll is wound, transported, and unwound. The second reason is that ribs embossed in the separator material cause it to wobble and thereby urge axial movement of the centerline of the separator material as its ribbed layers contact one another as the size of the roll increases.

FIGS. 1-2 illustrate a roll of separator material that is acceptable for use in the manufacture of a battery. FIGS. 3-4 illustrate a roll of separator material that is unacceptable for use in the manufacture of a battery.

FIG. 1 shows a perspective view of a roll 100 comprising battery separator material 102 wound around a core 104 and mounted on a portion of an enveloping machine 106. FIG. 2 shows a side view of the roll of FIG. 1. A common problem encountered in manufacturing batteries is that as battery separator material is unwound from a roll, the separator material slips relative to the core. One result of this slippage is lateral migration (i.e., movement in the axial direction of the core) of the separator material on the core. An example of this phenomenon is shown in FIGS. 3 and 4, which show roll 100 in which separator material 102 has migrated during winding so that the separator material 102 is no longer confined between the ends of core 104. Moreover, when the separator material is almost completely unrolled, the embossed ribs tend to urge axial movement of the remaining rolled portion of the separator material relative to the core. This misalignment can result in misfeed of the separator material into the enveloping stage of the machine, which can hinder or prevent proper operation of the machine. As a result, interruptions in manufacturing can occur, as well as damage to the separator material, other battery materials, or battery manufacturing equipment.

One approach to preventing migration has been adhesively attaching the separator material to the core, such as with tape. This is an unsuitable solution for many enveloping machines. Attaching the proximal end of the separator material to the core with tape or some other adhesive often results in undesirable tugging or recoil on the material being fed into the machine upon full unwinding of the roll. The tugging and/or recoil on the separator material results in misalignment of the separator material in the enveloping process. Therefore, an effective solution to migration without such undesirable consequences is needed.

SUMMARY OF THE DISCLOSURE

Disclosed herein are friction enhancing core surfaces of battery separator rolls and related methods. In a preferred embodiment, one or more friction enhancing materials, such as a strip or sleeve of sandpaper or rubber, are attached to a surface of a core that is to be used to wind-up a roll of a battery separator material. The friction enhancing materials reduce the probability of the separator material migrating off of the core by increasing frictional resistance between the core and the separator material by at least 1.75 times, such as at least 2 times, at least 3 times, or about 2-3 times. However, the friction enhancing materials allow for release of the separator material from the core without tugging or recoil (i.e., sufficient release characteristics are maintained). In some embodiments, the surface of the core itself may include a friction enhancing surface.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Disclosed herein are friction enhancing core surfaces of battery separator rolls and related methods. The term "friction enhancing" as used herein refers to a property of a material or surface on a core that increases frictional resistance between the core and a battery separator material as compared to the core without the material or surface but while maintaining sufficient release characteristics of the core (i.e., the battery manufacturing equipment does not undergo tugging and/or recoil as a roll of the battery separator material comes to an end and leaves contact with the friction enhancing material or surface on the roll). In accordance with the preferred embodiment, a friction enhancing surface can be provided by a material having friction enhancing properties that is attached to an outer surface of a core. "Friction enhancing materials" as used herein includes solids, liquids, gels, pastes, and combinations thereof that can be attached, applied, or otherwise secured to a core to provide a friction enhancing surface. For example, friction enhancing materials may be in the form of a sleeve or band that circumscribes the outer surface of the core. Preferably, the friction enhancing material is a strip of material applied to the outer surface of the core.

The friction enhancing surface reduces the probability of the separator material migrating off of the core by increasing friction between the core and the separator material as compared to a core without a friction enhancing surface. In some embodiments, one or more strips of friction enhancing material are attached to a surface of a core that is to be used to wind a battery separator material onto. In a particular embodiment, the strips of friction enhancing material comprise strips of sandpaper. In some embodiments the surface of the core itself may include or may be modified to include a friction enhancing surface.

Figure 5:
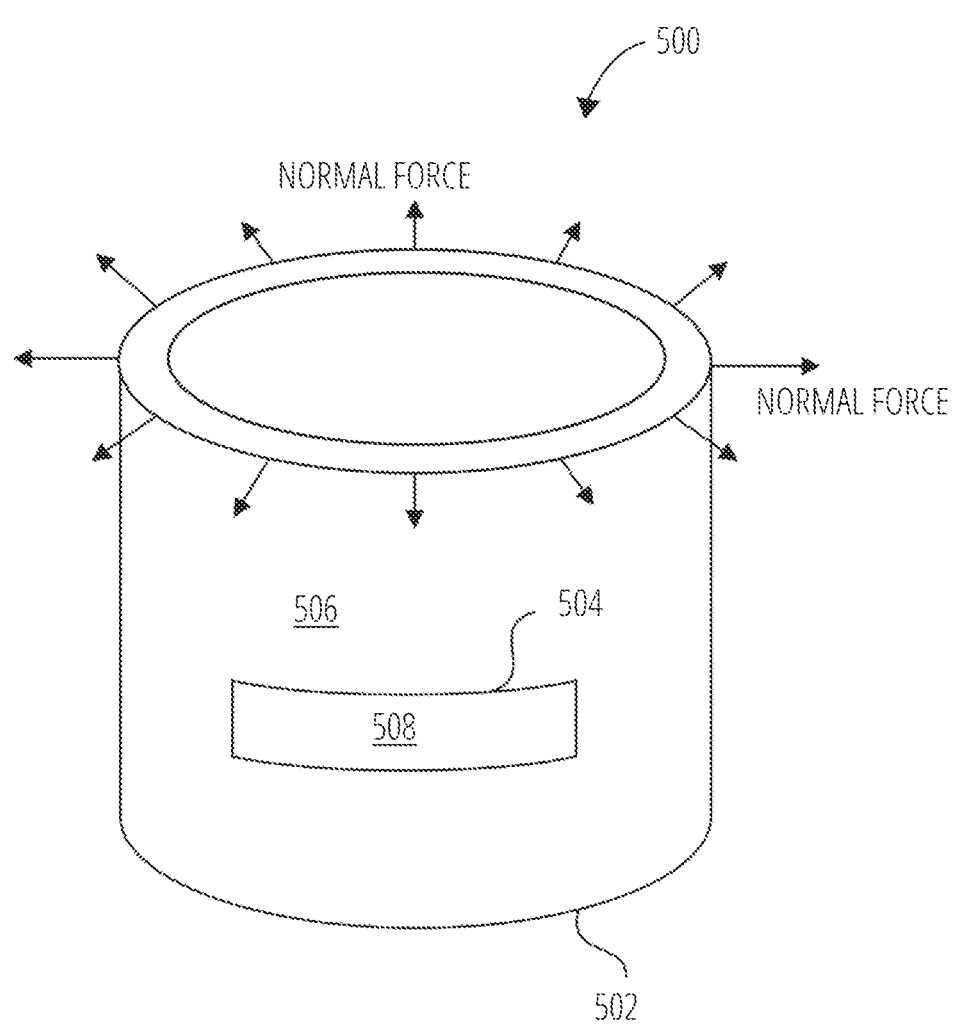
FIG. 5 is a diagram of a core for a roll of battery separator material, according to some embodiments.

FIG. 5 is a perspective view of a core 500 for inclusion in a roll of separator material, according to some embodiments.

The core 500 includes a base core 502 including an outside surface 506 having a base coefficient of static friction $\mu_{b-s}$ and a base coefficient of kinetic friction $\mu_{b-k}$. The core 500 also includes a friction enhancing material 504 on or secured to the outside surface 506 of the base core 502. The friction enhancing material 504 includes a friction enhancing surface 508 facing out from the core 500. The friction enhancing surface 508 has an enhanced coefficient of static friction $\mu_{e-s}$ that is greater than the base coefficient of static friction $\mu_{b-s}$ of the outside surface 506 of the base core 502, such as at least 1.75 times, at least 2 times, or about 2 to 3 times. The friction enhancing surface 508 also has an enhanced coefficient of kinetic friction $\mu_{e-k}$ that is greater than the base coefficient of kinetic friction $\mu_{b-k}$ of the outside surface 506 of the base core 502, such as at least 1.75 times, at least 2 times, or about 2 to 3 times.

The friction enhancing surface or material preferably provides a maximum coefficient of kinetic friction (as determined using the method of Example 1) to the separator material (to the backside, the rib side, or both) of at least about 0.8, such as from about 0.8 to about 1.2. The term "maximum" should be understood as not an upper limit on the coefficient of kinetic friction but rather the maximum coefficient of friction value obtained during the friction test. Thus, for example, at least 0.8 would be the minimum value desired for the maximum coefficient of kinetic friction.

The friction enhancing material preferably provides an average coefficient of kinetic friction to the separator material (to the backside, the rib side, or both) of at least 0.6, such as from about 0.6 to about 1.0.

As used herein, the term "coefficient of static friction" (sometimes indicated as "$\mu_s$" or some variant thereof) refers to a constant relating a frictional force (sometimes indicated as "$F_f$") (underwent by an object that is stationary relative to a surface) to a normal force (sometimes indicated as "$F_n$") (represented with arrows in FIG. 3, and exerted by the surface onto the object) ($F_f = \mu_s F_n$). For example, when separator material is wound around the core 500, tension in the separator material and/or other forces (e.g., gravity) causes the separator material to exert a force inwardly on the core 500. The core 500, in turn, exerts a normal force outwardly against the separator material to balance with the forces exerted inwardly by the separator material. As long as any forces exerted on the separator material in parallel to the outside surface 506 of the core 500 do not exceed the frictional force $F_f = \mu_s F_n$, the separator material remains stationary relative to the core 500.

As used herein, the term "coefficient of kinetic friction" (sometimes indicated as "$\mu_k$" or some variant thereof) refers to a constant relating a frictional force (underwent by an object that is in motion relative to a surface) to a normal force (exerted by the surface onto the object) ($F_f = \mu_k F_n$). For example, if forces on the separator material cause the separator material to slide relative to the core 500 (e.g., exceed ($F_f = \mu_s F_n$), while the separator material stays in motion relative to the core 500, the frictional force is given by ($F_f = \mu_k F_n$).

Figure 1:
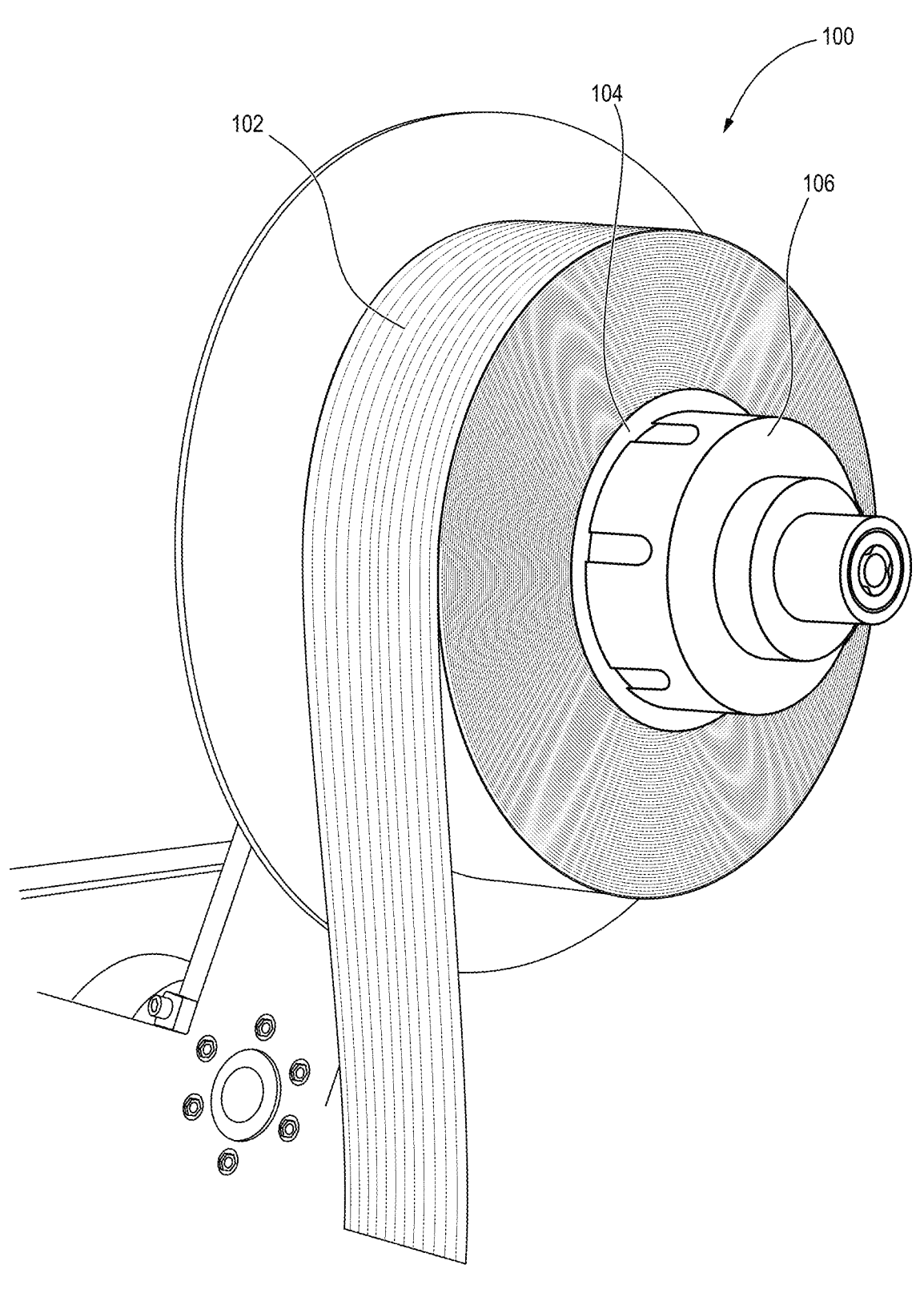
FIG. 1 is a pictorial perspective view of a roll of battery separator material that is exemplary of the state of the art.
Figure 2:
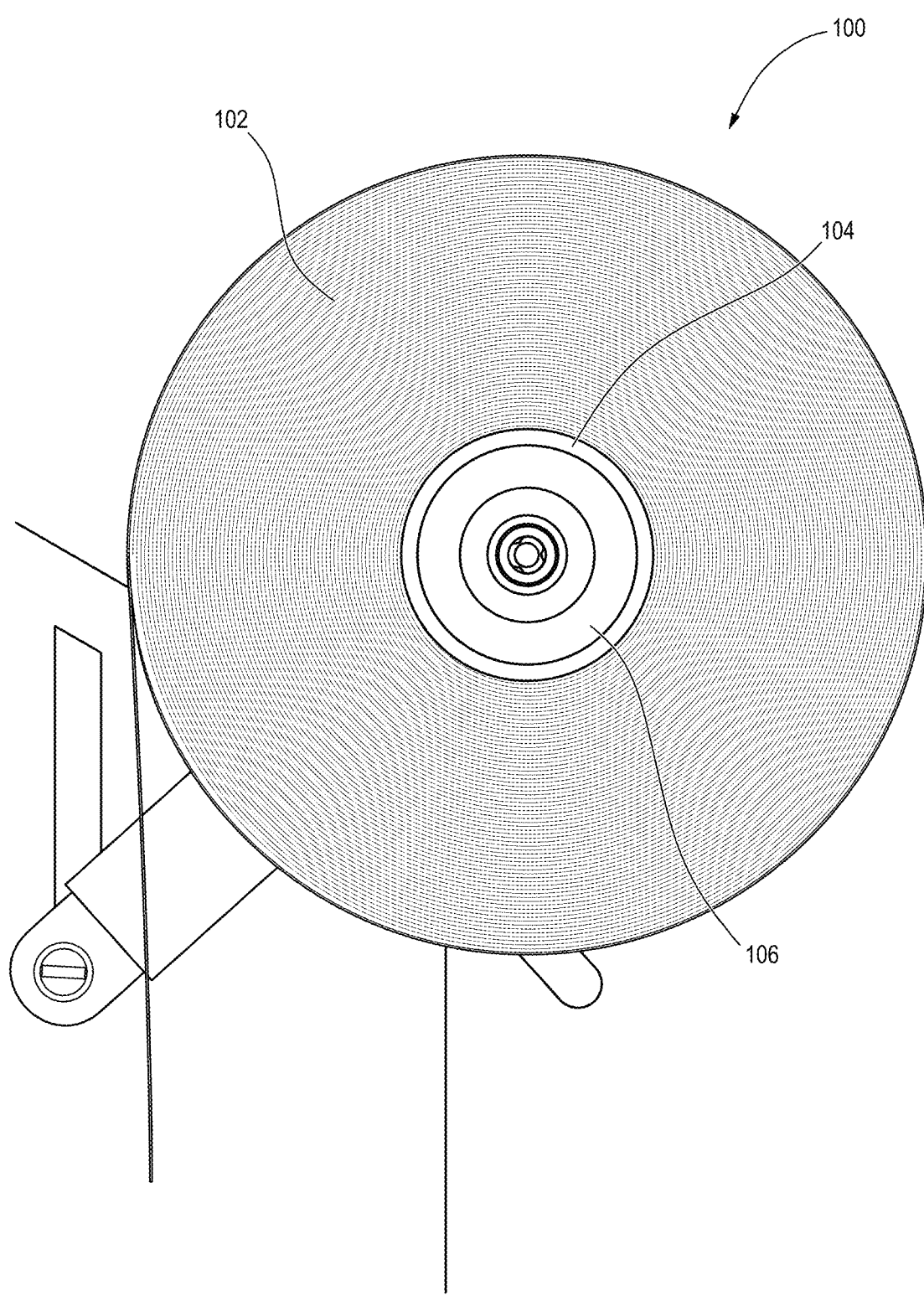
FIG. 2 is a pictorial side view of the roll of FIG. 1.
Figure 3:
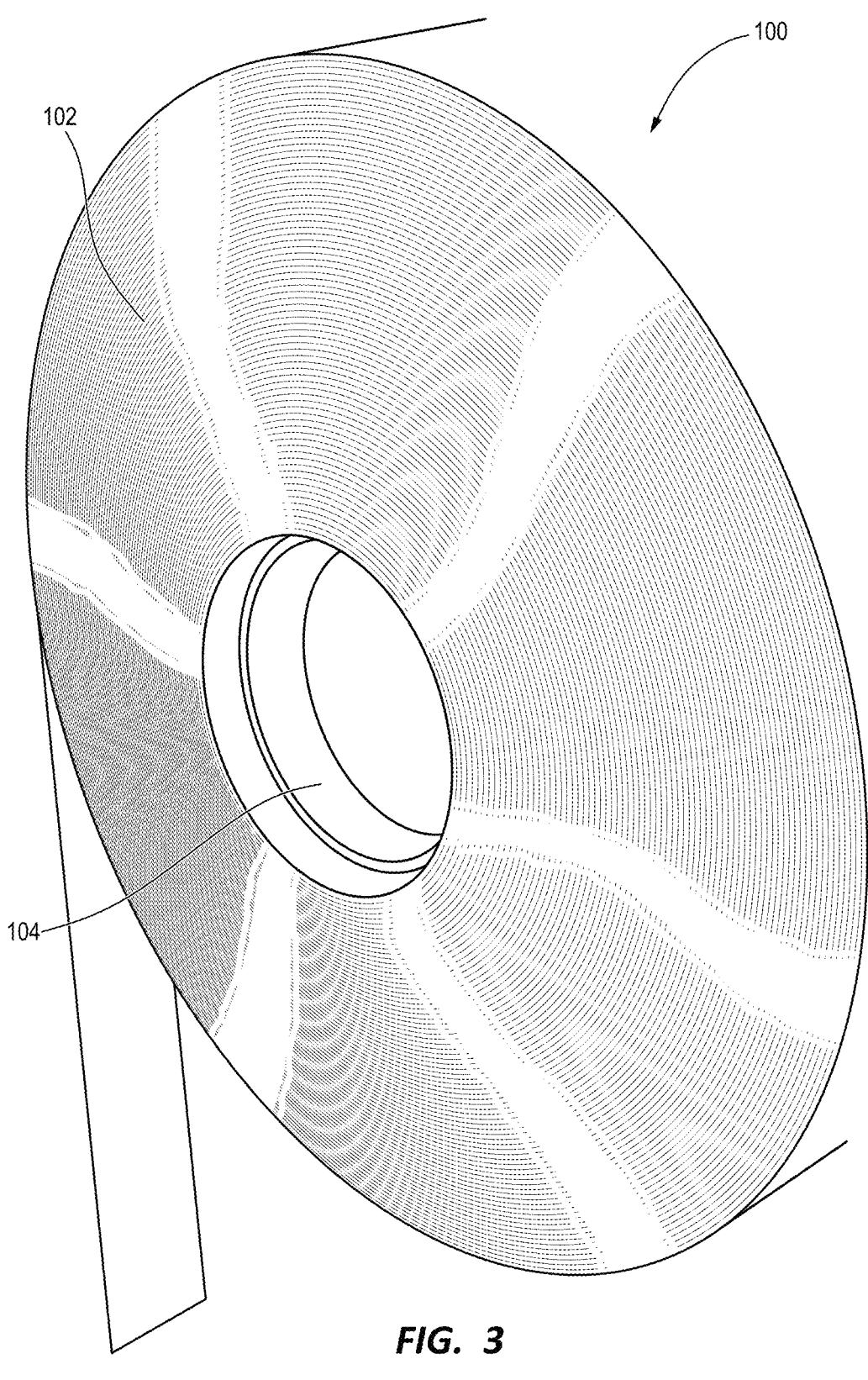
FIG. 3 is a pictorial perspective view of a prior art roll of battery separator material, showing migration of the battery separator material relative to the core on which said material is wound.
Figure 4:
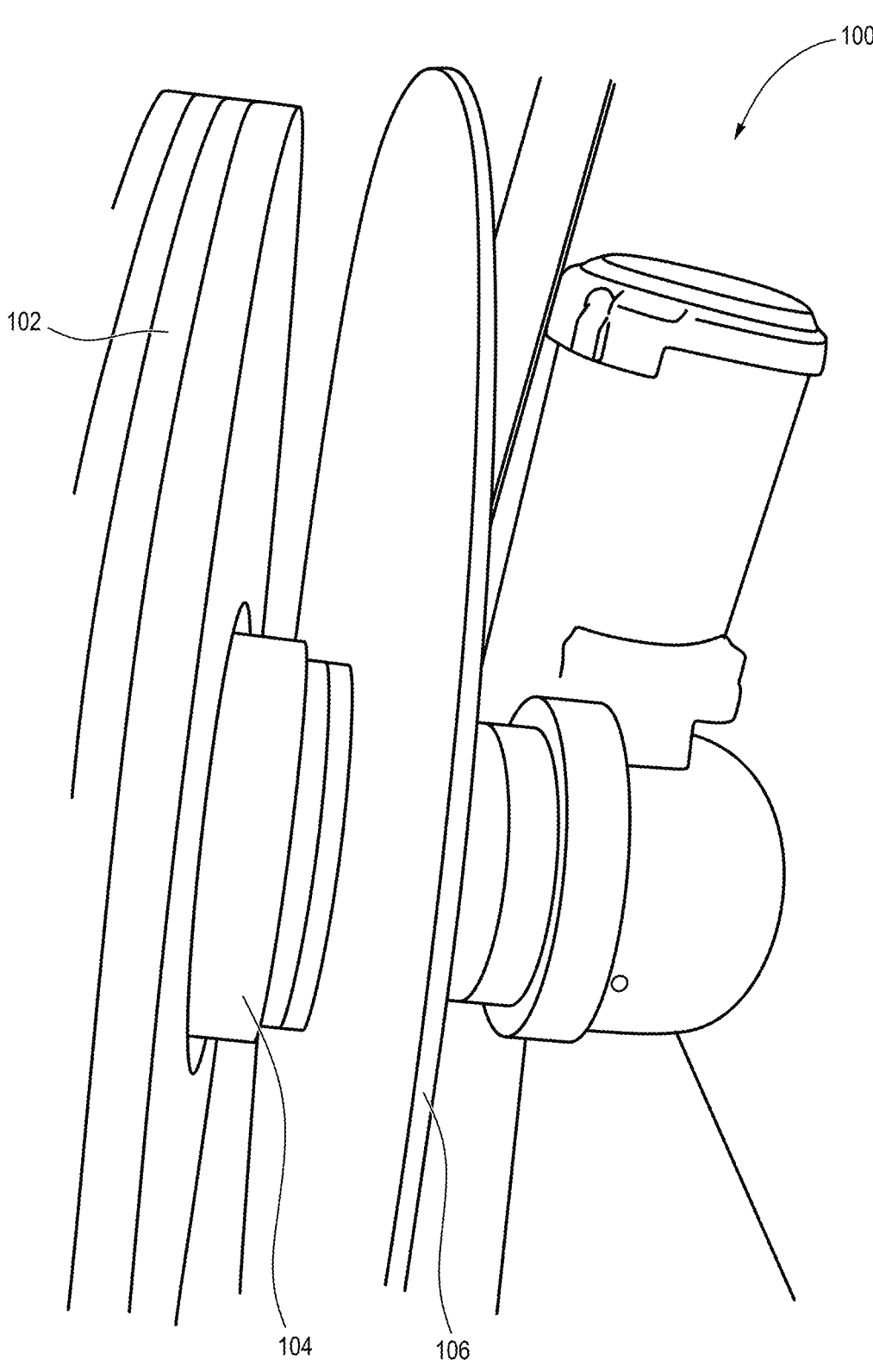
FIG. 4 is different pictorial perspective view of the prior art roll of FIG. 3.

In the example of FIG. 3, the presence of the friction enhancing material 504 increases the overall coefficients of static and kinetic friction of the core 500 relative to those of the outside surface 506 of the base core 502 alone. As a result, lateral migration of the separator material relative to the core 500 is less likely during winding and unwinding. Also, even when lateral migration of the separator material relative to the core 500 occurs, the sliding is likely to be stopped quicker than in the absence of the friction enhancing material 504, which may prevent the separator material from laterally migrating completely off of the core 500.

The friction enhancing material 504 has sufficient release characteristics such that battery manufacturing equipment does not undergo tugging and/or recoil as a roll of battery separator material comes to an end and leaves contact with the friction enhancing material 504. Preferably, the friction enhancing material 504 does not include an adhesive on its outer surface. The friction enhancing material 504 may be attached to the outside surface 506 with an adhesive; however, the adhesive does not come into contact with a battery separator material rolled onto the core 500.

The base core 502 may have a hollow cylindrical shape, such as that illustrated in FIG. 5, or some other shape (e.g., a solid cylindrical shape, a flat shape, a non-circular cylindrical shape, etc.). The base core 502 may include any of a variety of materials. For example, the base core 502 may include cardboard, a synthetic polymer (e.g., plastic), a metal, wood, or any other material suitable for supporting a roll of separator material. In some embodiments, the friction enhancing material 504 may include the same material as that of the base core 502. By way of non-limiting example, the friction enhancing material 504 may be formed directly from base core 502 itself by texturing the outside surface 506 of the base core 502. In some embodiments the friction enhancing material 504 is a separate material from that of the base core 502 and is secured to the outside surface 506 of the base core 502 (e.g., using an adhesive, staples, tacks, nails, rivets, or other securing mechanism). In some embodiments, the base core 502 may itself include a material that is friction enhancing, in which case the entire outside surface 506 may increase friction enough to prevent the separator material from lateral migration without the friction enhancing material 504.

FIG. 5 illustrates a single section of the outside surface 506 of the base core 502 including the friction enhancing material 504. However, the outside surface 506 of the base core 502 may include multiple areas of the friction enhancing material 504 or may even be completely covered in the friction enhancing material 504. FIG. 5 also illustrates a rectangular strip of the friction enhancing material 504 on the outside surface 506 of the base core 502. However, that the outside surface 506 may include one or more friction enhancing materials 504 of varying shapes other than a rectangle (e.g., a triangle, an octagon, a circle, an oval, another polygon, an irregular shape, etc.) and sizes. Preferably, a strip or other oblong shape of friction enhancing material is disposed on the outside surface 506 at an angle to the centerline of the centered roll (i.e., the direction the separator material will be pulled when it is unwound from the roll), such as from about 30° to about 60°, such as about 45°. However, the angle can also be about 0° (i.e., parallel to the pulling direction) as depicted in FIG. 5. Additionally, the angle can be about 90° (i.e., perpendicular to the pulling direction).

The problems associated with winding and unwinding ribbed battery separator materials can also arise with other sheet materials that include longitudinal ribs on at least one of the surfaces. Accordingly, in one embodiment, a method of rolling a ribbed material includes providing a core with a cylindrical shape having an outside surface with a width defined by outer edges (such as, for example, the base core 502). A friction enhancing surface is formed on at least a portion of the outside surface of a core as discussed above. The core width is selected so that a continuous sheet of the ribbed material has a width the same as or less than the width of the core. The ribbed material on the outer surface of the core is aligned sufficient that the outer edges of the core are flush with or extend beyond the outer edges of the ribbed material (e.g., the ribbed material is preferably centered between the outer edges of the core). The ribbed material is frictionally engaged with the friction enhancing surface. The ribbed material is wound around the outside surface of the core under tension. The frictional engagement between the core and the first loop of the ribbed material facilitates maintaining alignment of the ribbed material on the roll while winding the entire roll. This facilitates side margins of the wound roll having substantially level side surfaces that are centered between the outer edges of the core (i.e., the outer edges of the ribbed material are flush with or within the boundary defined by the outer edges of the core).

In the case of battery separator material, the ribbed material will often have a ribbed side and flat backside. The flat backside can be wound around the outside surface of the core. Alternatively, the ribbed surface can be wound around the outside surface of the core. In particular, the ribbed material can have longitudinally-oriented ribs, relative to the sheet of material, on at least one surface of the ribbed material.

A well-wound battery separator material roll facilitates battery manufacturing processes. Accordingly, in one embodiment, a battery manufacturing process includes providing a roll of battery separator material wound as described above with the benefit of the friction enhancing surface on at least a portion of the core (i.e., the side margins of the wound roll have substantially level side surfaces that are centered between the outer edges of the core). The frictional engagement between the core and the initial loop of the battery separator material help prevent lateral migration of the roll as it is unwound and fed to battery manufacturing equipment, such as enveloping equipment. Beneficially, because the battery separator material is not taped or otherwise adhesively secured to the core, as the roll runs out, the remaining portion of the battery separator material can be fully unrolled and released from core without the battery manufacturing equipment undergoing a tugging or recoil effect on the battery separator material. Therefore, disturbances in the battery manufacturing process can be avoided.

Likewise, a second roll of battery separator material wound as described above with the benefit of the friction enhancing surface on at least a portion of the core can be supplied to the battery manufacturing equipment, providing for minimal shutdown of the battery manufacturing process.

The end of the first roll can be taped or otherwise secured to the beginning of the second roll.

EXAMPLE 1

Figure 6:
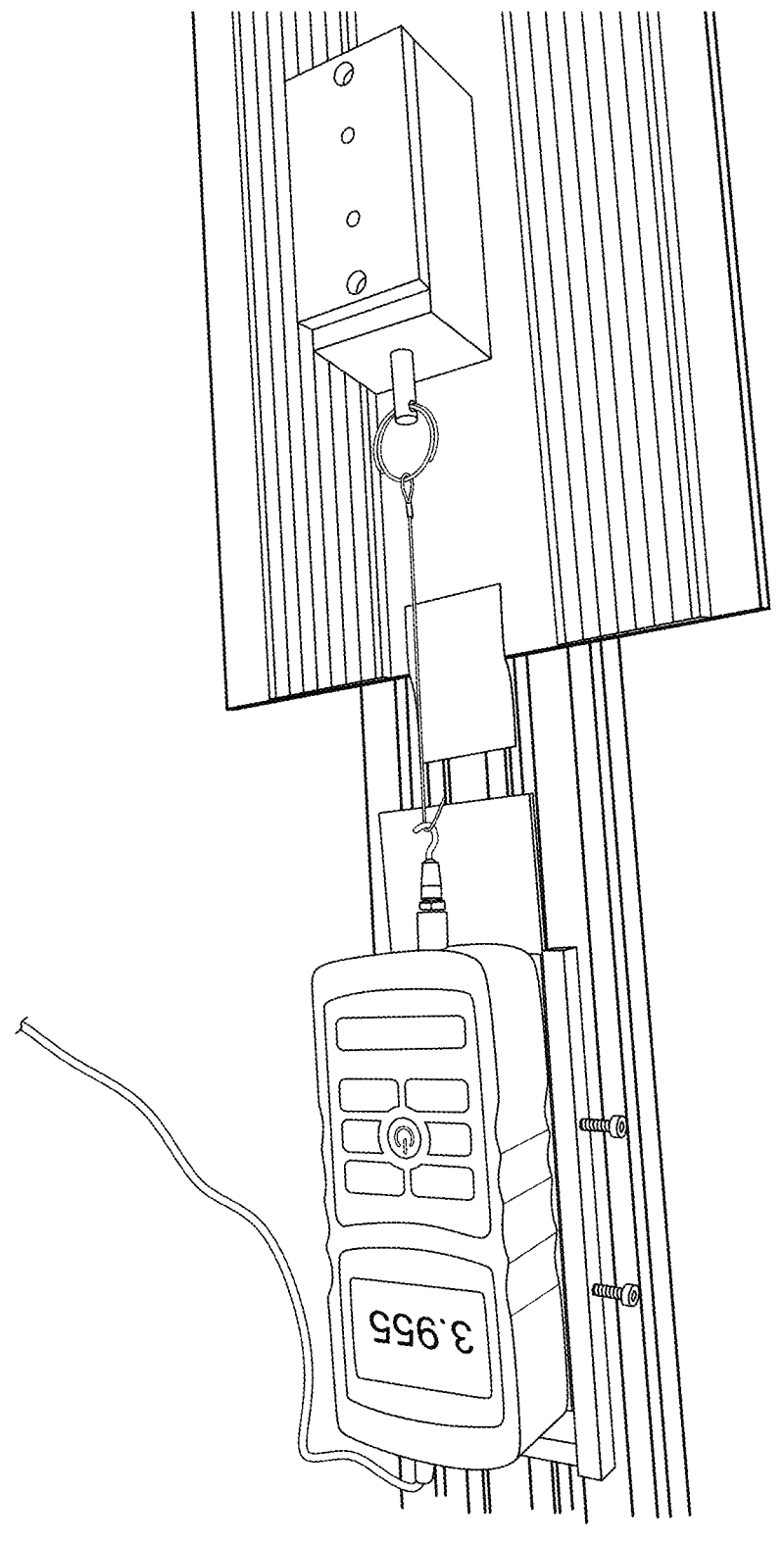
FIG. 6 depicts an image of the test setup used in the experiments of Example 1.

Frictional interaction between different core surface materials and separator materials was tested as depicted in FIG. 6. A cardboard core was cut, unrolled, and placed on a steel sheet as a flat rectangular surface. A one-inch (2.54 cm) wide strip of test material was attached to the cardboard at a 45° angle to the direction the separator material sample would be pulled. The test material strip was aligned with the front of the separator material sample at the start of the test. A small piece of double-sided tape and the magnets on the edge were used to hold the test material strip in place for the test. A 4"×2" separator material sample was attached to the underside of a weighted block and placed on the cardboard. The weighted block was connected to a Mark-10 model M5-5 force gauge. The total weight of the combined weighted block and separator material sample ranged from 414.6 to 414.7 grams. The test speed was about 8.2 mm/sec (or about 490 mm/min). Tests were conducted with the cardboard core by itself, two types of sandpaper ("US"=80 grit, "ESA"=100 grit), and two types of rubber—nitrile and latex (from rubber gloves).

Both the ribbed side and the backside of two different types of separator materials ("STD"=standard, "LR"=low resistance) were tested. The STD was an ENTEK PE separator with a GE profile, a width of 162 mm, a backweb thickness of 0.25 mm, and an overall thickness of 1.3 mm. The LR was an ENTEK LR separator with a GE profile, a width of 162 mm, a backweb thickness of 0.25 mm, and an overall thickness of 0.8 mm. The GE profile has a ribbed side and a flat backside. The ribbed side includes major ribs and minor ribs (the difference between the backweb thickness and the overall thickness is the major rib height relative to the backweb upper surface).

Each combination of test material (or core by itself), separator material sample, and separator side was tested six times. The maximum and average forces observed during the pull were recorded and used to calculate coefficients of friction for each combination. Without wishing to be bound by theory, the maximum and average coefficients of friction are believed to be maximum and average kinetic coefficients of friction, respectively. The results are shown in Table 1 below.

TABLE 1

Force (in newtons) applied in pulling different battery separator materials across the test surface at a constant rate, showing both maximum force and average force observed during the pull, as well as calculated coefficients of friction based on each force value. Each value is the average of six trials.

| Separator Material | Separator Side | Core Surface Material | Max (N) | Pull Average (N) | Max $\mu_f$ | Ave $\mu_f$ |
|---|---|---|---|---|---|---|
| STD | Backside | Cardboard core | 1.9 | 1.0 | 0.5 | 0.3 |
| STD | Backside | US Sandpaper | 4.4 | 3.3 | 1.1 | 0.8 |
| STD | Backside | ESA Sandpaper | 4.6 | 3.2 | 1.1 | 0.8 |
| STD | Backside | Nitrile from Glove | 4.2 | 3.9 | 1.0 | 1.0 |
| STD | Backside | Latex from Glove | 3.2 | 2.6 | 0.8 | 0.6 |
| LR | Backside | Cardboard core | 2.1 | 1.4 | 0.5 | 0.3 |
| LR | Backside | US Sandpaper | 4.3 | 3.6 | 1.1 | 0.9 |
| LR | Backside | ESA Sandpaper | 4.8 | 3.5 | 1.2 | 0.9 |
| LR | Backside | Nitrile from Glove | 4.0 | 3.7 | 1.0 | 0.9 |
| LR | Backside | Latex from Glove | 2.6 | 2.2 | 0.6 | 0.5 |
| STD | Rib Side | Cardboard core | 1.7 | 0.8 | 0.4 | 0.2 |
| STD | Rib Side | US Sandpaper | 4.2 | 2.9 | 1.0 | 0.7 |

TABLE 1-continued

Force (in newtons) applied in pulling different battery separator materials
across the test surface at a constant rate, showing both maximum force and
average force observed during the pull, as well as calculated coefficients
of friction based on each force value. Each value is the average of six trials.

| Separator Material | Separator Side | Core Surface Material | Max (N) | Pull Average (N) | Max $\mu_f$ | Ave $\mu_f$ |
|---|---|---|---|---|---|---|
| STD | Rib Side | ESA Sandpaper | 4.7 | 3.2 | 1.2 | 0.8 |
| STD | Rib Side | Nitrile from Glove | 3.6 | 3.1 | 0.9 | 0.8 |
| STD | Rib Side | Latex from Glove | 1.8 | 1.4 | 0.4 | 0.3 |
| LR | Rib Side | Cardboard core | 1.4 | 0.7 | 0.3 | 0.2 |
| LR | Rib Side | US Sandpaper | 4.1 | 3.2 | 1.0 | 0.8 |
| LR | Rib Side | ESA Sandpaper | 4.9 | 3.3 | 1.2 | 0.8 |
| LR | Rib Side | Nitrile from Glove | 3.4 | 3.1 | 0.8 | 0.8 |
| LR | Rib Side | Latex from Glove | 2.1 | 1.6 | 0.5 | 0.4 |

It will be apparent to those having skill in the art that many changes may be made to the details of the above-described embodiments without departing from the underlying principles of the disclosure. The scope of the present disclosure should, therefore, be determined only by the following claims.

The invention claimed is:

1. A roll of battery separator material, comprising:
a core including an outside surface, the core comprising a cardboard core or a plastic core;
a battery separator material separate and distinct from the core that is rolled around the core, the battery separator material configured to be used to separate electrodes of a battery after being unrolled from the core; and
a friction enhancing surface on at least a portion of the outside surface of the core to prevent the battery separator material from lateral movement relative to the outside surface of the core, the friction enhancing surface increasing the frictional resistance of the battery separator material on the core by at least 1.75 times, as compared to a core without the friction enhancing surface, while maintaining sufficient release characteristics of the outside surface of the core, and wherein the friction enhancing surface comprises a friction enhancing material including one or more strips of material separate from the core, the one or more strips of the material attached to the outside surface of the core using at least one of an adhesive, one or more staples, or one or more tacks, the friction enhancing surface being separate and distinct from the battery separator material, wherein the one or more strips of material are attached at an angle of 30° to 60° to the direction the separator material will be pulled when it is unwound from the roll.

2. The roll of claim 1, in which the friction enhancing material comprises sandpaper or a rubber material.

3. The roll of claim 1, in which the core includes the cardboard core.

4. The roll of claim 1, in which a coefficient of static friction at the friction enhancing surface is two times to three times a coefficient of static friction as compared to the outside surface of the core without the friction enhancing surface.

5. The roll of claim 1, in which a coefficient of kinetic friction at the friction enhancing surface is two to three times a coefficient of kinetic friction as compared to the outside surface of the core without the friction enhancing surface.

6. The roll of claim 1, in which the friction enhancing surface increases the frictional resistance of the battery separator material on the core by at least 2 times as compared to a core without the friction enhancing surface.

7. The roll of claim 1, wherein the friction enhancing surface provides to the battery separator material a maximum kinetic coefficient of friction of at least 0.8.

8. The roll of claim 1, wherein the friction enhancing surface provides to the battery separator material an average coefficient of kinetic friction to the battery separator material of at least 0.6.

9. The roll of claim 1, wherein the battery separator material comprises a polyolefin-based separator material.

10. A roll of battery separator material, comprising:
a core including an outside surface, the core comprising a cardboard core or a plastic core;
a battery separator material separate and distinct from the core that is rolled around the core, the battery separator material configured to be used to separate electrodes of a battery after being unrolled from the core; and
a friction enhancing surface completely covering the outside surface of the core to prevent the battery separator material from lateral movement relative to the outside surface of the core, the friction enhancing surface including one or more strips of material separate from and attached to the core using at least one of an adhesive, one or more staples, one or more tacks, one or more nails, or one or more rivets, the friction enhancing surface increasing the frictional resistance of the battery separator material on the core by at least 1.75 times, as compared to a core without the friction enhancing surface, while maintaining sufficient release characteristics of the outside surface of the core, the friction enhancing surface being separate and distinct from the battery separator material, the one or more strips of the material are attached at an angle of 30° to 60° to the direction the separator material will be pulled when it is unwound from the roll.

11. The roll of claim 10, in which the friction enhancing material comprises sandpaper.

12. A battery manufacturing process, the process comprising:
providing the roll of battery separator material of claim 10;
unrolling a portion of the battery separator material from the roll and supplying the portion of the battery separator material to battery manufacturing equipment while maintaining outer edges of a remaining portion of the battery separator material flush with or within outer edges of the core; and
unrolling the remaining portion of the battery separator material and releasing the remaining portion of the battery separator material from the core without tugging on the battery separator material, causing recoil within the battery separator material, or both.

13. The process of claim 12, further comprising:

providing a second roll of battery separator material, comprising:

a second core including an outside surface and having outer edges;

a second battery separator material having outer edges, having a width the same as or narrower than the second core, and positioned on outer surface of the second core sufficient that outer edges of the second core are flush with or extend beyond outer edges of the second battery separator material; and a friction enhancing surface on at least a portion of the outside surface of the second core to prevent the second battery separator material from lateral migration relative to the outside surface of the second core, while maintaining sufficient release characteristics of the outside surface of the second core; and unrolling a portion of the second battery separator material from the second roll and supplying the portion of the second battery separator material to battery manufacturing equipment while maintaining outer edges of a remaining portion of the second battery separator material flush with or within outer edges of the second core.

14. The process of claim 13, in which supplying the portion of the second battery separator material to battery manufacturing equipment includes taping or overlapping an end of the battery separator material released from the core with a beginning of the second battery separator material to continue feeding battery separator material to the battery manufacturing equipment.

15. The roll of claim 10, wherein the battery separator material comprises a polyolefin-based separator material.

16. The roll of claim 1, in which the friction enhancing material comprises sandpaper.

17. The roll of claim 10, in which a coefficient of static friction at the friction enhancing surface is two times to three times a coefficient of static friction as compared to the outside surface of the core without the friction enhancing surface.

18. The roll of claim 10, in which a coefficient of kinetic friction at the friction enhancing surface is two to three times a coefficient of kinetic friction as compared to the outside surface of the core without the friction enhancing surface.

19. The roll of claim 10, in which the friction enhancing surface increases the frictional resistance of the battery separator material on the core by at least 2 times as compared to a core without the friction enhancing surface.

20. The roll of claim 1, wherein the friction enhancing surface provides to the battery separator material a maximum kinetic coefficient of friction of at least 0.8.

* * * * *